United States Patent [19]
Trembley

[11] 3,742,808
[45] July 3, 1973

[54] COMPOSITE, SELF-SEALING FEMALE FASTENER

[75] Inventor: William Harvey Trembley, Granada Hills, Calif.

[73] Assignee: VSI Corporation, Pasadena, Calif.

[22] Filed: Nov. 23, 1970

[21] Appl. No.: 91,728

[52] U.S. Cl. .................. 85/32 R, 85/1 JP, 85/50, 85/61, 151/7, 151/38
[51] Int. Cl. .......................................... F16b 37/00
[58] Field of Search ................. 85/1 JP, 32, 61; 151/38, 37, 140 W, 7; 277/166

[56] References Cited
UNITED STATES PATENTS

| | | | |
|---|---|---|---|
| 2,541,096 | 2/1951 | Poupitch | 151/37 |
| 2,851,079 | 9/1958 | Heller | 151/38 |
| 2,940,495 | 6/1960 | Wing | 85/61 |
| 3,184,769 | 5/1965 | Barwood | 85/1 JP |
| 3,311,147 | 3/1967 | Walker | 85/61 |
| 3,550,498 | 12/1970 | Briles | 85/1 JP |

FOREIGN PATENTS OR APPLICATIONS

| | | | |
|---|---|---|---|
| 660,630 | 4/1963 | Canada | 85/61 |
| 1,315 | 2/1901 | Great Britain | 151/38 |
| 889,887 | 2/1962 | Great Britain | 85/1 JP |
| 924,162 | 4/1963 | Great Britain | 151/7 |

Primary Examiner—Edward C. Allen
Attorney—Christie, Parker & Hale

[57] ABSTRACT

A composite, self-sealing female fastener has an internally threaded nut, a washer carried by the nut and a seal of compacted powdered Teflon disposed between axially spaced-apart interior bearing surfaces of the nut and the washer. During the fabrication of a joint the washer will seat on the sheet to cause such rotation. Rotation of the nut with respect to the washer and axial movement of the nut towards the washer produces inward extrusion of seal material to fill interior voids in the nut and cooperating joint components and removes essentially all of the seal material from between the two bearing surfaces. In the event that in any given joint not all of the seal material is required to fill interior voids, excess seal material will extrude longitudinally between a skirt of the washer and the base of the nut and will be divided into segments by dimples in the skirt. An annular, conical protrusion of the washer provides a barrier against seal material entering between the washer and the surface of the sheet of the joint. An embodiment provides a torque-off wrenching member on the nut calibrated to effect a predetermined joint preload with an applied torque sufficient to separate the wrenching member from the nut.

17 Claims, 3 Drawing Figures

PATENTED JUL 3 1973 3,742,808

INVENTOR.
WILLIAM H. TRIMBLEY
BY
Christie, Parker & Hale
ATTORNEYS

COMPOSITE, SELF-SEALING FEMALE FASTENER

The present invention relates to self-sealing female fasteners in general, and, more in particular, to a self-sealing female fastener which employs axial and rotational movement of a nut with respect to a washer to extrude a seal residing between the two into sealing relationship with cooperating joint components without the resulting joint having seal material as a load carrying component.

Joints effected through the fastening of two or more sheets together by male and female fasteners are often required to be leakproof. For example, in the aircraft industry, fuel tanks and cabins have many joints in their structural panels which must be leakproof. Another example is in chemical applications where tanks for carrying gases and liquids require leakproof joints.

A leak through a joint follows a path from a high pressure side to a low pressure side of the joint through leak paths. Leak paths are often completed between the threads of the male and female fastener, between the female fastener and the sheets, or both.

An effective seal, then, must present an effective barrier against all possible leak paths on the female fastener side of a joint.

Prior art methods of effecting a sealed joint have taken many forms. Add-on compounds, such as wet or dry epoxies, plastics and greases are one example. Add-on sealants, however, do not always produce good seal integrity because of the difficulty in closing all possible leak paths and maintaining the path closed throughout the desired life of a joint. Leak paths may result, for example, from improper joint preparation, inadequate application of sealant compounds, and deterioration of sealing material.

Most satisfactory joints require that there be a compressive preload applied by the male and female fastener to the sheets of the joint to firmly hold the sheets together. This compressive preload is necessary to prevent movement of the sheets and to avoid fatigue failure of a joint. The compressive preloading of the sheets also aids in obtaining fluid-tight integrity between the sheets themselves. Accordingly, an effectively sealed joint must maintain this compressive preload throughout the life of the joint and without loss of the seal. One prior art seal approach requires that seal material be used in maintaining or in transmitting the compressive preload from the female fastener to the sheets. Adequate joint loading is often lost, however, with this type of seal arrangement because of seal creep resulting from the inability to completely confine the seal within structurally stronger elements.

Many joints are made in panels which bound volumes which must be maintained scrupulously clean, as aircraft fuel tanks. Obviously in these environments, seals cannot result in contamination.

Another requirement for an effective seal, which is particularly acute where a large number of joints are required, is that each seal should usually be installed without the addition of excessive labor time and without materially adding to each joint's cost. Another requirement for an effective seal is that the seal be effected with a minimum amount of weight addition.

Accordingly, there is a need for an effective self-sealing female fastener for use in a joint fabricated from a male and female fastener, which is capable of sustaining joint preloading throughout the life of the joint, which is easily installed, economical to produce, which blocks all possible leak paths, which does not produce environmental contamination, and which is light weight.

The present invention contemplates the extrusion of an interior seal between two members, such as a nut and a washer, of a composite self-sealing female fastener to fill interior voids which would otherwise constitute leak paths in a joint of the female fastener, a male fastener and two or more sheets. The nut is capable of rotating with respect to the washer during the extrusion of seal material. It has been found that this rotation together with the force of compression owing to axial movement of the nut with respect to the washer effects excellent removal of seal material from between the washer and the nut. With this removal, there is no seal material bearing axial joint preload.

A specific form of the composite self-sealing female fastener of the present invention has its seal disposed between cooperating seal bearing surfaces of the nut and the washer. These bearing surfaces are interior of the fastener. The bearing surfaces are brought into effective abutting contact when the female fastener is set to effect substantially complete extrusion from between the two surfaces and avoid seal material sustaining joint preload. The bearing surface of the nut is defined by an annular, radially extending surface which bounds an axial bore through the nut. The bearing surface of the washer is also defined by an annular surface bounding a bore through the washer. The nut has at least a portion of its bore internally threaded for engaging the threads of a male fastener. The seal also has a bore to accept a male fastener. The axial bore in the nut may extend through a base of the nut which forms a collar or standoff portion and defines the nut's seal bearing surface. This portion of the bore is normally not threaded and has a slightly larger diameter than the major diameter of the nut's internal threads to accommodate thread run-out, grip variations and provide space for tapered or enlarged shanked male fasteners. Wrenching means is provided on the nut for setting of the fastener.

The seal is preferably fabricated from a powdered Teflon. Powdered Teflon upon extrusion is consolidated to a point where its grains disappear and it becomes a homogeneous, continuous solid. As such, after extrusion it does not flake or powder. Moreover, its resistance to flow increases substantially upon consolidation. The load on this material where it consolidates is above the load required to flow the material. Because of this, the powdered Teflon will flow into interior voids or cavities between the male fastener and the female fastener to completely conform to and fill these cavities. Teflon which is not a powder does not easily conform upon extrusion to the walls of interior voids or cavities. It has also been found that during the early stages of setting the fastener the powdered Teflon within interior voids being trapped will consolidate if sufficient loading pressure is applied to it. This loading pressure is preferably provided by a deformable section of the washer which deforms inwardly upon the application of a compressive load to reduce the volume available for the Teflon to occupy. Specifically, the deformable section in the presently preferred embodiment bounds the seal bearing surface of the washer and protrudes away from the seal bearing surface of the nut. As such, the seal bearing surface of the washer has a slope which converges in a direction away from the nut forming a cone interrupted by the bore of the seal retaining washer, which sloping surface produces preferential extrusion radially inward toward the male member to fill the voids of the threads and the counterbore.

It has also been found that the rotation of the nut with respect to seal material between the seal bearing surfaces of the nut and washer results in the essentially complete extrusion of seal material from between these two bearing surfaces. The result is that there is no seal material bearing preload in the joint. In addition, an important result obtained by having the nut rotatable with respect to the washer to effect complete extrusion of seal material from between the two bearing surfaces is the avoidance of over-stressing the components of a joint using the female fastener. Most high quality joints are fabricated with a torque wrench or torquing tool which tightens a nut until some predetermined torque is indicated on the torquing instrument. If seal material, such as Teflon, were between the sheet and the washer or between the nut and the washer, torsional resistance in these areas would be very small. As a consequence, more of the applied torque would be transmitted into axial loading of the male member upsetting the torque-tension relationship normally indicated by the torque measuring instrument. This can result in failure of joint components.

In accordance with a presently preferred embodiment of the present invention, the washer has an annulated frusto-conical protruding section. The section protrudes from the sheet abutting side of the washer and converges towards the axis of the washer such that that portion of the section bounding the washer's bore engages a sheet before any other portion of the section or the washer does. This feature compensates for any irregularities in the sheet's surface by effecting a positive metal-to-metal barrier against seal material extruding between the washer and a sheet.

The interior side of the protruding section presents an angled seal bearing surface which aids in effecting preferential extrusion of seal material radially inward of the fastener. The protruding section deforms during the setting of the fastener and becomes essentially planar when the fastener is set. In addition to the consolidation of powdered Teflon into a continuous, grainless mass as previously pointed out, this feature also assures effective engagement of the nut's seal bearing surface and the seal bearing surface of the washer throughout their extent in a set fastener.

In the preferred form of the present invention the washer has an annular, axially extending skirt which extends away from the sheet abutting surface of the washer and which is spaced slightly from and overlies a portion of the outside of the nut. Dimples formed in the skirt engage the nut to effect capture of the washer with the nut while permitting rotation of the nut with respect to the washer. These dimples also part extruded seal material which is extruded between the skirt and the nut for such material's easy removal. This skirt and nut relationship is a part of a broader aspect of the present invention which contemplates the provision of sufficient seal material to fully fill all interior voids regardless of variations in the volume of the voids which must be filled. For example, when a tapered shank male fastener is used with the fastener of the present invention, less seal material will be required than would be the case where a right cylindrically shaped shank were employed. Moreover, different joints and male fasteners have different grip accommodations. In addition, manufacturing tolerances must be provided for.

Because the present invention provides a female fastener which assures that all seal material will be nonload bearing when the fastener is set, the fastener is ideally suited to have a torque limiting feature. Accordingly, one embodiment of the present invention provides a torque-limited female fastener. The fastener has a nut portion with an axial bore which is internally threaded for engaging the threads of a male fastener. In one form, an outer surface of the nut is adapted to engage a wrenching member such that the application of a setting torque to the wrenching member will set the nut and, upon the occurrence of a predetermined amount of wrenching resistance, the wrenching member will separate from the nut.

The features, aspects and advantages of the present invention discussed in general above will become more apparent from the following description, appended claims and drawings.

Figure 1:
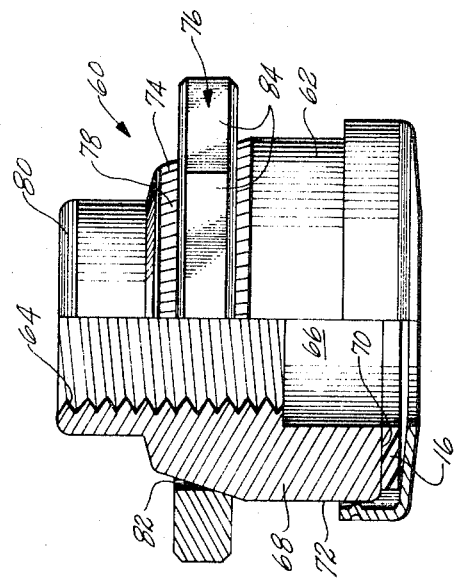
FIG. 1 is an elevational view, partly in half section, of a preferred form of the composite, self-sealing female fastener of the present invention.

FIG. 1 illustrates a composite, self-sealing female fastener 10 in accordance with the preferred embodiment of the present invention. The fastener includes a nut 12, a washer 14 and a seal 16 disposed between the two.

The nut has a base or seal bearing end 18 which defines a radially extending seal bearing surface 20. The washer has a generally radially extending seal bearing surface 22 which is angled away slightly from complementary seal bearing surface 20. The two seal bearing surfaces are disposed to compressively engage and extrude the seal.

The seal is preferably of a compacted powdered Teflon composition. The seal is flat and has a bore 24 for the passage of a male fastener. It has been found that powdered Teflon can be pressed into the seal shape with the application of from 2,500 psi to 5,000 psi pressure. This range of pressure should not be exceeded too much, however, for it is important for the extrusion process to retain the granular form of the Teflon, that is, not to consolidate it into a homogeneous, grainless mass until all interior voids have been filled and seal material has been extruded from between the seal bearing surfaces of the nut and the washer. Preferably, the powdered Teflon is ground virgin Teflon. It is not ball-milled.

The nut has an internally threaded axial bore 26 which extends coaxially of the bore of the seal. Similarly, washer 14 has a bore 28, which is coaxial with the other two bores just mentioned, for receiving a male fastener. A counterbore 30 in base 18 has a diameter which is slightly larger than the major diameter of the threads of bore 26. The counterbore opens into the threaded portion of the bore through a frusto-conical pilot section 32.

The nut has a wrenching surface 34 which may be in the form of twelve-pointed lobes or other suitable means of rotation disposed intermediate the nut's ends.

Figure 2:
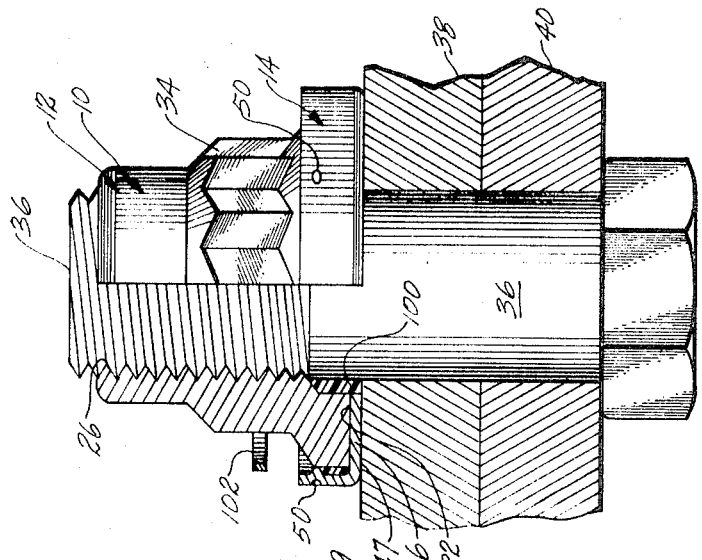
FIG. 2 is a view of the female fastener illustrated in FIG. 1 as it would appear set.

A brief description of how the fastener is set will now be presented to facilitate an understanding of the more detailed description which follows. With reference to FIG. 2, fastener 10 is typically used with a cooperating male fastener in the form of a bolt 36 to secure two or more sheets together to fabricate a joint. The sheets are indicated by reference numerals 38 and 40. Female fastener 10 is threaded onto the male threads of the male fastener. With application of a wrenching torque on wrenching surface 34, washer 14 will engage the proximate surface of sheet 38. With the tightening of the fastener 10, the nut will move towards the sheet to engage and compress seal 16. The washer will feel this compressive force and will soon stop rotating, leaving the nut of the fastener alone free to rotate. The application of a wrenching torque continues until all of the seal material is extruded out from between the complementary seal bearing surfaces of the nut and the washer into the interior voids on the female fastener side of the joint. In the illustrative embodiment, a void is shown by a space between the male fastener and the female fastener within counterbore 30 and pilot section 32. The seal material will be completely extruded out from between the complementary bearing surfaces because powdered Teflon minimizes resistance to compressive forces and, what is also important, rotation of the nut with respect to the washer during the terminal stages of the extrusion produces directed preferential inward extrusion of seal material from between the bearing surfaces augmenting axial movement of the nut towards the washer and finally pressurizing compacted seal material in the interior voids. The final pressure encourages the progress of seal material to the homogeneous amorphous state.

Proceeding with a more detailed description of the female fastener illustrated in FIG. 1, the description of nut 12 will initially be completed. Counterbore 30 is right cylindrical and is of approximately the same diameter as the diameter of bores 24 and 28 through seal 16 and washer 14, respectively. The axial extent and diameter of the counterbore are determined by such well known factors in fastener design as male fastener shank diameter, the presence or absence of a taper on the male fastener's shank, grip accommodation, manufacturing tolerances, and male thread run-out. An axially extending section 42 of the nut extends from wrenching surface 34 away from base 18. This section presents a relatively thin wall which admits to a slight deformation to effect a thread lock. Base 18 has an outer, axially extending and annular surface 44 which terminates at a frusto-conical transition surface 45. The latter surface has a taper converging towards and meeting the wrenching surface.

Washer 14 has a frusto-conical protruding section 46 bounding bore 28. The sheet abutting surface of the washer, indicated by reference numeral 47, includes that surface of the frusto-conical protruding section on the exterior side of the washer and includes a generally radial section 48 which is disposed outwardly of the frusto-conical protruding section. The taper of the frusto-conical protruding portion is preferably in the neighborhood of 1° to 3°. The direction of the taper may be described as being convergent away from nut 12.

Seal bearing surface 22 of the washer includes a tapered inner surface of the frusto-conical protruding section and may include as well a radially extending inner surface of the radial section of the washer. The resulting, gently sloped seal bearing surface of the washer increases in distance from the nut with diminishing radius and promotes inward extrusion of washer material by affording less resistance to extrusion in that direction.

Protruding section 46 is such that it becomes generally planar and normal to the axis of the washer at an applied axial compressive load of about 20,000 psi which typically corresponds to a load of about 50 percent of the required design load of fastener 10.

A longitudinally extending skirt 49 extends from the radial portion of the washer around surface 44 of base 18. The inner diameter of the skirt is slightly larger than the diameter of surface 44 to define with this surface annular channel for excess extruded seal material to pass into and possibly through.

To hold the washer and the nut together for storage, shipping and installation purposes, a plurality of regularly spaced dimples 50 are formed in the skirt to frictionally engage external surface 44 of base 18. The friction engagement is not intended to effect rotational coupling of the washer with the nut during setting, at least after the washer engages a sheet. The dimples serve a second function and that is to initiate the separation of extruded seal material into sections as it passes by them. For this purpose and for the engagement purpose the dimples can be replaced by knife-like tabs struck in the side of the skirt.

Figure 3:
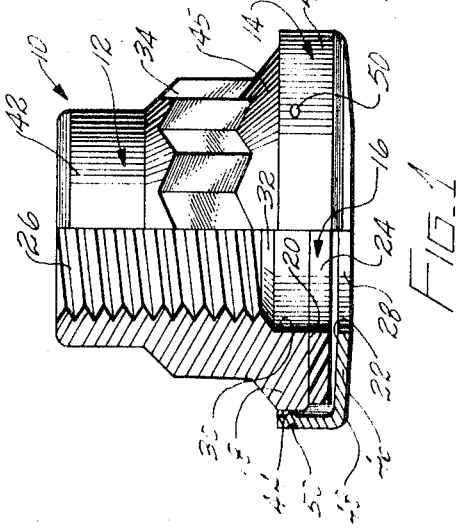
FIG. 3 is an elevational view, partly in half section, illustrating an alternate embodiment of the present invention which employs a torque limiting feature.

With reference to FIG. 3, the embodiment of the invention illustrating the application of torque control means is illustrated and indicated in general by reference numeral 60. The embodiment illustrated has a torque control feature which employs a separate wrenching member and a nut. However, a torque controlled nut having a thin-walled frangible section between a portion of the nut having a wrenching surface and the balance of the nut will also suffice. The seal and washer are identical to the seal and washer described in detail with reference to FIG. 1. Therefore these elements bear the same reference numerals. The fastener includes a nut 62 having an axial bore constituted of an internally threaded section 64 and a counterbore 66. A base 68 of the nut is disposed radially about counterbore 66 and defines the counterbore. This base portion, which may be viewed as the seal bearing end of the nut, has a radially extending seal bearing surface 70 and an external right cylindrical surface 72. The axial length and diameter of the counterbore are again determined by male fastener shank diameter, grip accommodation, manufacturing tolerances, and male thread run-out. A frusto-conical wrenching member engagement section 74 is disposed intermediate the ends of the nut and has means for engaging a wrenching member 76. These means are preferably in the form of regularly disposed splines or knurls 78. An axially extending section 80 meets the frusto-conical engagement section and provides a thin-walled section which may be deformed to effect a thread lock.

Wrenching member 76 before its mounting on nut 62 has a right cylindrical bore, a portion of which is shown by reference numeral 82 in FIG. 3. The wrenching member is forced onto the splined surface of engagement section 74, as by a press fit, and is deformed in the process. The amount of taper or draft of the engagement section and the resulting deformed portion of the bore of the wrenching member many be considerably less than that illustrated, a large amount of taper being shown for clarity.

The wrenching member has wrenching flats 84 in a standard hexagonal pattern. It is clear that the amount of engagement of the wrenching member with the splines of the engagement section of the nut determines the point at which the wrenching member will shear or break away from the nut with the application of a torquing force. Thus, the angled relationship of engagement provides a means to effect a range of desired loads at torque-off and resulting preload in a joint by varying the amount of engagement between the wrenching member and the engagement surface of the nut and, in addition, allows the wrenching member to separate freely at torque-off.

A detailed description of the setting of the composite self-sealing female fastener 10 of the present invention will now be presented. As previously mentioned, the fastener is threaded onto a male fastener 36 as by a torque applying wrenching tool. The wrenching torque is applied on wrenching surface 34 to rotate the fastener with respect to the threads of the male fastener. Frusto-conical protruding section 46 will compressively engage the sheet surface adjacent to it at the edge of its bore 28. This compressive engagement will prevent seal material from extruding between the sheet abutting surface of the washer and the sheet. Continued wrenching will produce axial and rotational movement of nut 12, the axial movement being towards the sheet. The axial movement effects a compressive force on seal 16 which begins to extrude seal material. At the outset of extrusion, the gentle slope of the seal bearing surface of the washer produces preferential extrusion inwardly toward the shank of the male fastener to fill the voids bounded by the male fastener, the female fastener, and sheet 38. As wrenching proceeds, the seal will extrude more and more. After the application of about 50 percent of the setting load of a typically rated high strength nut, the frusto-conical protruding section will disappear and the washer between the base of the nut and the sheet will become essentially radial or flat. With powdered Teflon, extrusion is typically completed with the approximate applied loads just given. In absolute terms powdered Teflon will completely extrude with a compressive loading of from between about 10,000 psi to about 20,000 psi when completed in the 2,500 psi to the 5,000 psi range. With the collapse of the protruding section, the Teflon within the voids will be pressurized and consolidated, resulting in a homogeneous, grainless Teflon mass therein. After extrusion substantially all of the Teflon is extruded from between the seal bearing surfaces, with typically a Teflon thickness of from 0.0002 to 0.0005 inches remaining. With this residual thickness, the bearing surfaces are in essentially metal-to-metal contact.

During the initial stages of the setting process, the washer will be arrested by frictional engagement of the sheets from rotating with the nut. This is a salutory feature of the present invention for two reasons. The first is that before an appreciable amount of the setting load has been applied, the washer being stopped will not Brinnel the surface of the sheet. The second purpose is to effect essentially complete extrusion of the seal material from out between the seal bearing surfaces of the washer and the base. As previously mentioned, it has been found that with rotation of the nut with respect to the seal, more complete extrusion of such seal's material as powdered Teflon is effected.

Another salient feature of the present invention is that the diameter of the counterbore of the nut is only slightly larger than the major diameter of the nut's threads. As a consequence, during the application of the load from the bolt on the threads there is very little moment acting on the base which would tend to deflect the outer portion of the base's seal bearing surface away from the sheet and deflect the inner radial portion of the bearing surface towards the sheet. The avoidance of this type of moment applied to the base is extremely important for it means that less base material need be used in any given nut with the result of a weight saving which is highly important in aerospace applications. In addition, it maintains the seal bearing surface of the base essentially radial and as a consequence the unit loading on the washer at the end of the setting process is essentially uniform. With moment induced deformation, that portion of the washer immediately adjacent the washer's bore could be highly loaded with the result that the washer could extrude to compromise the integrity of the resulting joint.

The particular joint illustrated in FIG. 2 has extruded seal material to fill in all the interior voids between the shank of the bolt and the counterbore as well as the shank of the bolt and the frusto-conical pilot section between the counterbore and the threads. This void filling seal material is indicated by reference numeral 100. The seal material may also progress for a distance from the transition section between the threads of female fastener 10 and the bolt as well as between the outer surface of the shank of the bolt and the wall of the bore of the sheets in which the bolt resides. The amount of seal material required to fill all these voids did not require all the seal's material and allowed for some seal material to be extruded radially outward into the annulus between the inner wall of the skirt and the outer radial wall of the base. Some of this material is extruded upwardly and has been separated circumferentially by the dimples for subsequent removal. This extruded material is consolidated, homogeneous and grainless and may be removed as sheet-like strips, indicated by reference numeral 102. This extruded material provides visual evidence of seal formation as an inspection criterion.

The use of powdered Teflon as a seal has many distinct advantages. Initially, powdered Teflon is relatively free flowing and therefore extrudes easily. By way of comparison, solid, grainless Teflon typically requires about 80 percent of the total applied axial load on the nut to effect complete extrusions, whereas powdered Teflon requires only about 25 to 50 percent of the total applied load for complete extrusion in typical high strength nuts. As a consequence, solid Teflon is not as likely to fill all the interior voids in the female fastener side of a joint. It will be recalled that the presence of Teflon between the sheet and the washer or between the seal bearing surfaces of the nut and washer prevents the application of known torque-tensile relationships to determine the amount of load to be applied to the nut. Because powdered Teflon extrudes very early in the setting process, the well known torque-tensile load relationship of threaded fasteners is reestablished before the critical final stages of setting where a torque reading or value is used to establish joint preload. Once extruded, the powdered Teflon becomes grainless and consolidated. As such, flaking or powdering of the material extruded into the channel bounded by the washer's skirt is avoided and environmental contamination also avoided.

The setting of a joint with the self-sealing female fastener illustrated in FIG. 3 is quite similar to that previously described, with the exception that with the application of a predetermined amount of wrenching torque on wrenching member 76, the wrenching member will either separate from the splines of engagement section 74 as by shear failure, or will fracture into two or more pieces. After fracture, the pieces are of course removed.

Thus the present invention provides a self-sealing female fastener which effects essentially complete extrusion of seal material from between the seal bearing surfaces which, in a joint, engage one another for the transmission of joint loads. Moreover, the extrusion process with the use of such material as powdered Teflon results in a substantially sheet-like compacted extrusion which does not contaminate such environments as the insides of fuel tanks and is readily removed. In addition, accurate torque control is afforded for those applications where a known amount of preload is necessary.

What is claimed is:

1. An improved composite self-sealing female fastener comprising:
   a. a nut having an axial bore, female threads in the axial bore for engaging the male threads of a male fastener, an annular seal bearing surface at one axial end of the nut, and wrenching means for accepting a wrenching tool to apply a setting torque to the nut;
   b. a washer rotatable with respect to the nut and having an axial bore for receiving the male fastener, a sheet engaging section including an externally disposed annular sheet abutting surface for engaging a sheet of a joint effected with the female fastener and the male fastener, the sheet abutting surface having a protruding, annulated frusto-conical section which converges towards the axis of the washer to define a portion of the sheet abutting surface bounding the washer's axial bore which engages a sheet before any other portion of the sheet abutting surface, an internally disposed annular seal bearing surface spaced axially from the seal bearing surface of the nut, and an axially extending skirt overlying in spaced relationship an axially extending external surface of the nut to define an annular channel for receipt of excess extruded seal material;
   c. a seal of extrudable material disposed between the seal bearing surfaces of the nut and the washer, the seal having an axial bore for receiving the male fastener; and
   d. means between the skirt and the nut in the channel between them to separate seal material extruded into the channel for subsequent removal.

2. The improved self-sealing female fastener claimed in claim 1 wherein the means in the skirt to part seal material extruded into the channel into strips for subsequent removal also rotationally couples the washer to the nut concentric thereto.

3. The improved self-sealing female fastener claimed in claim 2 wherein the means recited therein is a plurality of circumferentially spaced dimples in the skirt.

4. The improved self-sealing female fastener claimed in claim 1 wherein the interior axial end of the sheet abutting section defines the seal bearing surface, such surface paralleling the sheet abutting surface, and the frusto-conical section is deformable upon the application of an axial setting load on the nut of substantially less than the rated capacity of the nut to form a flat, radially extending section for substantially complete engagement by the seal bearing surface of the nut upon completion of seal extrusion from between the two seal bearing surfaces.

5. The improved self-sealing female fastener claimed in claim 1 wherein the inner surface of the frusto-conical section defines a wall sloping away from the seal bearing surface of the nut and which forms at least a part of the washer's seal bearing surface, and the frusto-conical section is deformable into a flat section with its internal and external surfaces being substantially normal to the axis of the nut upon the application of an axial compressive load during the fabrication of a joint substantially lower than the design preload of the nut.

6. The improved self-sealing female fastener claimed in claim 5 wherein the seal is formed of powdered Teflon.

7. The improved self-sealing female fastener claimed in claim 6 wherein the seal is compacted sufficiently to maintain its shape but not enough to form a grainless homogeneous solid.

8. The improved self-sealing female fastener claimed in claim 1 wherein there is sufficient seal material such that upon setting of the fastener seal material will extrude into and at least substantially fill interstices radially inward of the seal bearing surfaces of the nut and washer.

9. An improved composite self-sealing female fastener comprising:
   a. a nut having an internally threaded axial bore, a right cylindrical counterbore coaxial with and opening into the internally threaded axial bore, the counterbore extending from a seal bearing end of the nut, an annular, radially extending seal bearing surface at the seal bearing end, and means for accepting a wrenching tool for the application of a setting torque to the nut;
   b. a washer rotationally and concentrically coupled to the nut at the seal bearing end and having an axial bore for accepting a male fastener, an external frusto-conical sheet abutting surface protruding away from the nut to engage the surface of a sheet first at the washer's bore, an internal frusto-conical seal bearing surface facing the seal bearing surface of the nut and progressively increasing in axial distance away from such surface with decreasing radius, the section of the washer which defines the external and internal frusto-conical surfaces being deformable in compression upon the application of an applied setting load substantially lower than the design preload of the nut to produce orientations of such external and internal surfaces which are substantially normal to the axis of the nut, means between the washer and the nut for venting excess seal material;
   c. a seal of extrudable material disposed between the seal bearing surfaces of the nut and the washer, the seal having an axial bore for receiving the male fastener and being capable of substantially complete extrusion from between the seal bearing surfaces with an applied axial setting load substantially lower than the design preload of the nut; and d. the venting means including an axially extending annular skirt for the washer which is spaced radially from an external surface of the nut to define therewith an annular channel for the receipt of excess extruded seal material.

10. The improved composite self-sealing female fastener claimed in claim 9 wherein the nut includes a portion having the wrenching means, which portion is adapted to separate from the remainder of the nut upon the application of a predetermined torque to the wrenching means.

11. The improved composite self-sealing female fastener claimed in claim 9 wherein the seal is of powdered Teflon.

12. The improved composite self-sealing female fastener claimed in claim 9 including means in the channel between the skirt and the nut for separating excess extruded seal material into strips during the setting of the fastener for subsequent removal, such means providing the rotational and concentric couple between the washer and the nut.

13. An improved composite self-sealing female fastener comprising:
   a. a nut having
      i. an axial bore with internal threads along a length thereof for accepting the threads of a male fastener;
      ii. an axial right cylindrical counterbore of the axial bore opening into the threaded section thereof and opening at a seal bearing end of the nut, the counterbore having an axial length sufficient to accommodate a predetermined grip variation and thread run-out of the male fastener and a diameter sufficient to accommodate a tapered or oversized shank of the male fastener;
      iii. an annular, radially extending seal bearing surface at the seal bearing end and bounding the counterbore;
      iv. an axially extending external annular surface on the seal bearing end and bounding the counterbore; and
      v. wrenching means for accepting a wrenching tool to apply a setting torque to the nut; and
   b. a washer having
      i. an axial bore for accepting the male fastener;
      ii. an annular frusto-conical section bordering the washer's axial bore and protruding away from the seal bearing surface of the nut, the frusto-conical section defining a conical external sheet abutting surface and a conical internal seal bearing surface, the latter surface facing in the direction of the nut's seal bearing surface, the frusto-conical section being deformable under compressive load to become essentially flat at an applied axial setting load substantially below the total required load of the nut;
      iii. an axial extending annular skirt integrally connected with the frusto-conical section and spaced radially from the external annular surface of the seal bearing end of the nut to define therewith an annular axially extending channel; and
      iv. means in the skirt for rotatably coupling the washer concentrically to the nut, such means extending into the annular channel between the seal bearing end and the skirt to also separate extruded seal material passing by such means from the balance of the seal for removal; and
   c. a seal of material which flows freely under compressive load having an axial bore for accepting a male fastener and being disposed between the seal bearing surfaces of the nut and the washer, the seal being capable of substantially complete extrusion from between these seal bearing surfaces at an applied axial setting load substantially below the rated axial load of the nut and of substantially increasing its resistance to flow under compressive load at loads approaching the rated axial load of the nut.

14. The improved composite self-sealing fastener claimed in claim 13 wherein the seal is of powdered Teflon.

15. The improved composite self-sealing fastener claimed in claim 14 wherein the separation and coupling means includes a plurality of circumferentially spaced-apart protrusions formed in the skirt and extending radially inwardly for engagement of the external surface of the nut, the protrusions rotatably coupling the washer to the nut.

16. An improved composite self-sealing female fastener comprising:
   a. a nut having an axial bore, female threads formed in the axial bore, an annular radially extending seal bearing surface at a seal bearing end of the nut, and an annular external surface for receiving a wrenching member;
   b. a washer rotatably coupled to the nut at the seal bearing end thereof and having an axial bore for accepting a male fastener, an externally protruding, frusto-conical section bounding the washer's axial bore defining at least a portion of an internal seal bearing surface and at least a portion of an external sheet abutting surface, the external sheet abutting surface and the internal seal bearing surface being spaced axially from the seal bearing surface of the nut;
   c. a seal of extrudable material disposed between the seal bearing surfaces of the nut and the washer, the seal having an axial bore for receiving the male fastener and being capable of substantially complete extrusion from between the seal bearing surfaces with an applied axial setting load substantially below the maximum design load of the nut;
   d. the washer having an axially extending skirt in overlying spaced relationship with the nut at the seal bearing end thereof to define therewith an annular channel for receiving excess extruded seal material and including means formed in the wall of the skirt to separate excess extruded material in the channel into strips with the setting of the fastener; and
   d. a wrenching member disposed on the wrenching member receiving surface of the nut and in nonrotatable engagement therewith, the engagement between the wrenching member and the nut being such that upon the application of a predetermined wrenching torque on the wrenching member, the wrenching member separates from the nut.

17. The improved composite self-sealing female fastener claimed in claim 16 wherein the engagement between the wrenching member and the nut is effected through splines, and the wrenching member engagement surface of the nut is frusto-conical with the base of the section being towards the sheet abutting end of the fastener, and the wrenching member has a right cylindrical bore before engaging the frusto-conical surface which is at least partially deformed to conform to the frusto-conical wrenching member engagement surface along a predetermined length of the wrenching member's bore to effect a predetermined engagement area for controlling the value at which the wrenching member separates from the nut.

* * * * *